(12) United States Patent
Brown et al.

(10) Patent No.: US 10,650,181 B2
(45) Date of Patent: May 12, 2020

(54) SPATIAL LOCATION OF VIAS IN A PRINTED CIRCUIT BOARD

(71) Applicant: NOKIA SOLUTIONS AND NETWORKS OY, Espoo (FI)

(72) Inventors: Paul J. Brown, Wakefield (CA); Alex L. Chan, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/711,900

(22) Filed: Sep. 21, 2017

(65) Prior Publication Data

US 2019/0087524 A1 Mar. 21, 2019

(51) Int. Cl.
*G06F 30/39* (2020.01)
*G06F 30/394* (2020.01)
*G06F 17/50* (2006.01)

(52) U.S. Cl.
CPC ............ *G06F 30/39* (2020.01); *G06F 30/394* (2020.01)

(58) Field of Classification Search
CPC .................................................. G06F 17/5068
USPC .................................................. 716/119, 137
See application file for complete search history.

(56) References Cited

U.S. PATENT DOCUMENTS

| | | | | |
|---|---|---|---|---|
| 6,869,750 B2* | 3/2005 | Zhang et al. | ......... | H01L 21/486 428/106 |
| 6,882,045 B2* | 4/2005 | Massingill et al. | ... | H01L 21/486 257/724 |
| 7,239,526 B1* | 7/2007 | Bibee | ................... | H05K 1/0219 361/788 |
| 8,476,538 B2* | 7/2013 | Eldridge et al. | ...... | H05K 3/4664 174/262 |
| 9,510,448 B2* | 11/2016 | Ao et al. | ................ | H05K 1/113 |
| 9,769,925 B2* | 9/2017 | Chan et al. | ............ | H05K 1/181 |
| 9,780,044 B2* | 10/2017 | Limb et al. | ............ | H01L 23/15 |
| 9,844,135 B2* | 12/2017 | Wu et al. | ............... | H05K 1/115 |
| 9,881,904 B2* | 1/2018 | Das et al. | ............. | H01L 23/481 |
| 2004/0184219 A1* | 9/2004 | Otsuka et al. | .... | H01L 23/49805 361/306.3 |
| 2009/0237884 A1* | 9/2009 | Sauciuc | .............. | F28D 15/0266 361/699 |

OTHER PUBLICATIONS

Teng et al.,"Via-In-Pad Plated Over (VIPPO) Design Considerations for the Migration of a Unique Solder Separation Failure Mode" , Sep. 2016, SMTA Procedding pp. 161-167.*

* cited by examiner

*Primary Examiner* — Sun J Lin
(74) *Attorney, Agent, or Firm* — Kramer Amado, P.C.

(57) ABSTRACT

A printed circuit board (PCB) having a layout aligned with a Ball Grid Array (BGA) package, the PCB including a plurality of victim vias arranged in the PCB, at least one aggressor via arranged in the PCB having a transition with at least one victim via, wherein the transition is a space in the PCB between a victim via and an aggressor via along a row direction or a column direction, and the victim via is not positioned next to more than one transition.

13 Claims, 4 Drawing Sheets

SPATIAL LOCATION OF VIAS IN A PRINTED CIRCUIT BOARD

TECHNICAL FIELD

The invention relates printed circuit board (PCB) design layouts, and to spatial location of vias in a printed circuit board.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include a layout for a printed circuit board (PCB) to be aligned with a BGA package, including a plurality of victim vias arranged in a PCB, at least one aggressor via arranged in the PCB having a transition with at least one victim via, wherein the transition is a space in the PCB between a victim via and an aggressor via along a row or column direction, and the victim via is not positioned next to more than one transition.

The victim via may not be positioned next to more than one aggressor via. An arrangement of transitions may be designed to correspond to a BGA having a fixed pinout.

An arrangement of transitions may be designed to correspond to a BGA having a fixed pinout. The victim via may be a VIPPO.

An aggressor via may extend lower than a first tercile of a PCB. The aggressor via may be a back-drilled via having a length smaller than a first tercile of a PCB.

There may not be more than one aggressor via spaced one transition from a victim via in a row or column direction. At least two consecutive rows of VIPPOs may intersect the at least two consecutive columns of VIPPOs.

Various embodiments may also include a layout structure of a PCB having rows and columns, including a plurality of groups of first via structures having first heights laid out in rows and columns, a plurality of second via structures having second heights, laid out in rows and columns, wherein a distance between two groups of first via structures includes at least two rows or columns.

A height of first via structure may be less than one-third a height of the PCB. An upper portion of the second via structure may have a conductive pad thereon.

The first via structures may have a first thermal expansion characteristic and the second via structures have a second thermal expansion characteristic different from the first thermal expansion characteristic.

The layout of first via structures and second via structures may correspond to signal layers of the PCB. The distance between two groups of first via structures may include at least two transitions, wherein a transition is a space between a first via structure and a second via structure.

Various embodiments may also include a method of designing a printed circuit board (PCB) to be aligned with a BGA package, including laying out a plurality of victim vias arranged in a PCB, laying out at least one aggressor via arranged in the PCB having a transition with at least one victim via, wherein the transition is a space in the PCB between a victim via and an aggressor via along a row or column direction, and the victim via is not positioned next to more than one transition.

A BGA may be mounted on the PCB and the BGA has a fixed pinout before designing the PCB.

A BGA may be mounted on the PCB and the BGA has a configurable pinout before designing the PCB. Laying out the victim vias and aggressor vias the layout of first via structures and second via structures may correspond to signal layers of the PCB.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
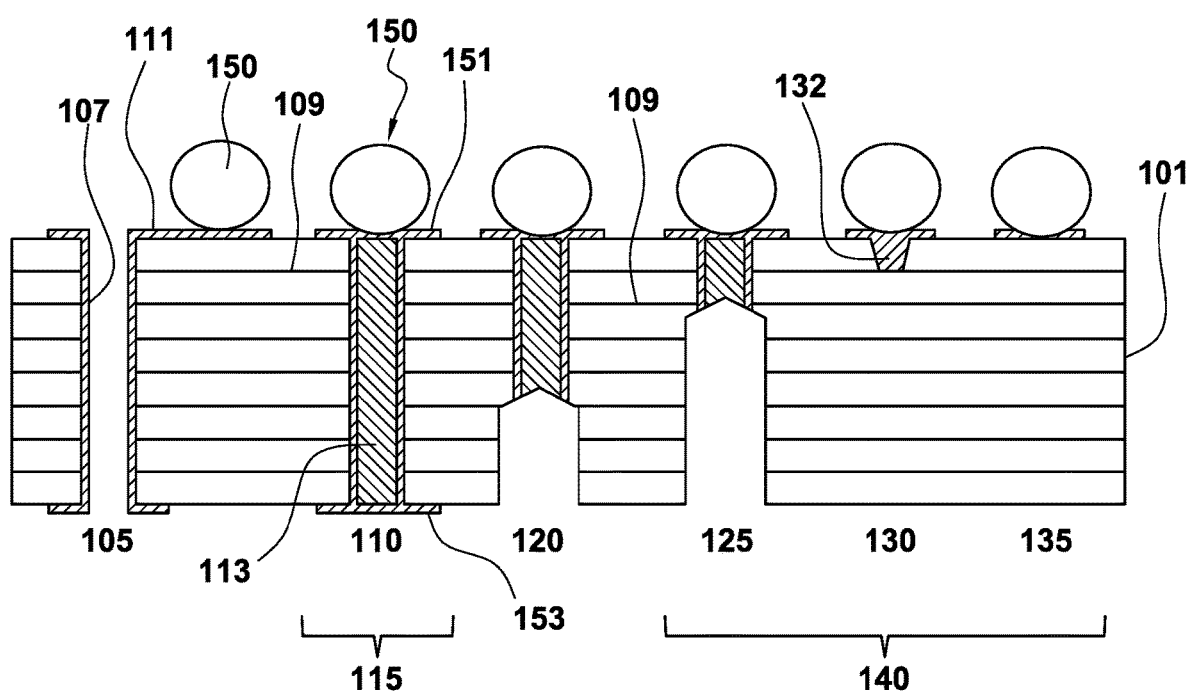
FIG. 1 illustrates a cross sectional view of various relevant PCB interconnect structures in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Design trends toward higher speed, higher density circuit cards have led to an expanded use of a variety of different types of printed circuit board (PCB) interconnects. While new designs abound, recent applications are calling for mixed use of different types of interconnect structures for the routing of a single device. While there is sound electrical reasons for doing this, there have been a growing number of solder joint defects linked to some uses of certain mixed interconnect combinations. Exact failure mechanisms are not well understood to those heavily invested in related research, let alone the broader original equipment manufacturer (OEM) industry. As result, a primary mitigation strategy has been the promotion of design rules that call for the avoidance of mixed interconnect usage, electing instead to use all of one type of interconnect under a single device. This choice results in foregoing the stated electrical advantages of mixed interconnect mentioned above. Embodiments described herein rely on a better understanding of the failure mechanism and use of this knowledge to develop alternate design rules that lessen or eliminate the risks of solder joint defects when using mixed interconnects.

Previous industry attempts have included the avoidance of using mixed interconnects under a single device. While this approach addressed some failure problems, it does not allow for any of the advantages that motivate the combinations of mixed interconnects in the first place. Attempts have been made with the use of thinner boards (~0.093") and/or the use of dielectric materials with ultra-low coefficients of expansion to lessen the likelihood of failures by essentially decreasing the magnitude of the stresses at the root of these failures. While these proposed solutions will work in theory, in practice it is not possible to constrain the thickness of many of these new designs to anything less than 0.125" let alone 0.093", so that option is very limited and impractical. Regarding the use of materials with ultra-low coefficients of expansion, this is a theoretical solution as the thermomechanical properties of conventional dielectric materials available today are much higher than those needed to significantly reduce or eliminate the possibility of these defects.

Through extensive testing, embodiments described herein are based on a better understanding of the failure mechanism of mixed interconnect structures and leverage this knowledge to evaluate a variety of potential interconnect combinations/configurations with an eye towards minimizing or eliminating associated solder joint defects. Testing supports the idea that pronounced failure rates occur in areas where filled Via In-Pad Plated Over (VIPPOs) are placed in ball grid array (BGA) pads immediately adjacent to surface only BGA pads. In these instances it is believed that a VIPPO will act as a rivet, locally constraining board thermal expansion through reflow, while adjacent surface-only pads have no such constraints. This may create a pronounced difference in board z-axis expansion in a localized area (essentially in the distance of a single pitch of the BGA ~0.040").

Upon a first reflow, paste and solder ball heights adjust during melting resulting in sound solder joints. However once formed, the differential expansion resulting from subsequent reflow heating (during second side assembly, rework, wave soldering, . . . etc.) generate substantial stresses in the solder joint associated with the VIPPOs (keeping in mind that the joints now start off as solid). As the temperature approaches melting (SAC305 T=217C), the stress may increase to a point where the VIPPO joint tears apart, just prior to the adjacent joints actually reflowing. Understanding this, embodiments described herein reduce the stress being exerted on the VIPPO joint by techniques and structures such as altering the configuration of adjacent interconnects in a way to decrease the concentration of high expansion interconnect structures (surface pads, deep back-drilled vias, u-vias) and that of the lower expansion VIPPO, and identifying a subset of the high expansion interconnect structures that expand less than others by virtue of their construction and by extension develop less stress in the adjacent VIPPOs.

Embodiments described herein address problems related to stresses in the areas of BGA ball joints between a BGA and a PCB. Stresses formed at such joints may weaken joints in an undesirable manner or break joints altogether. Embodiments described herein were arrived at through multiple test runs of building test boards, placing circuit components thereon, and performing failure analysis to determine effectiveness of solutions.

Several solutions may involve attempting to remedy a weak joint after a board and interconnects may have been manufactured. Embodiments described herein may continue this practice, yet may also be used as a design practice or design technique to implement at the time of laying out a printed circuit card to minimize the problems or to avoid the problems altogether.

VIPPOs or through vias, as discussed above, find many uses in the art. VIPPOs span the entire thickness of a PCB or circuit card to send and receive signals from various layers within the board. As described further herein, some interconnect vias do not extend all the way through a board. During reflow and other heat based operations, when VIPPOs are placed next to other interconnect structures with shallower depths, defects may occur at the joints above the vias and in the immediate proximity thereof.

Because problems are related to a differential expansion of via structures in the boards, several manufacturers have avoided the use of mixing of the different types of technologies and interconnects. Many manufacturers may use totally VIPPO interconnects, or totally plated through hole (PTH) interconnects, but no mixing of the two. Manufacturers also may avoid using VIPPOs with back-frilled vias. This limitation in structure and usage can limit the functionality and use of boards, bringing about transmission and reception distortion of signals, as discussed herein. Many designs will lead to at least the combination of VIPPO and back-filled vias.

FIG. 1 illustrates a cross sectional view of various relevant PCB interconnect structures in accordance with embodiments described herein. Reference numeral 105 may designate a PTH in which a through hole has been drilled or otherwise formed in a multi-layered PCB 101. The PTH 105 may include metal plating 107 on either side of the through hole. The multi-layered PCB 101 may include a plurality of layers that include conductive traces 109 thereon. Solder balls 150 may be mounted on bond pads 111. In operation, a chip (not illustrated) may be mounted to the plurality of solder balls 150 and communicate signals through a given solder ball 150 through a bond pad 111, through a metal plating 107, to a conductive trace 109 within the multi-layer circuit board 101. A signal may be routed for transmission or reception, to be filtered through various circuit elements, to communicate between mounted chips, or the like.

Via 110 represents a VIPPO. The VIPPO 110 is similar to the PTH via 105, but the VIPPO 110 is filled with an insulator material 113 such as an epoxy resin or the like. Providing an insulator material 113 in the VIPPO 110 adds a design advantage to the PCB 101 not present with the PTH in that solder balls 150 may be mounted directly over the vias instead of to the side. Signals may be routed along the outer edges of the VIPPO 110. Metal plating along the edges of PTH 105 and VIPPO 110 may be termed a via barrel.

Via 120 represents a first back-drilled via having a shorter length. The longer length refers to a longer remaining via structure and a shorter drilling length of a back-drill from the bottom of the PCB 101. Via 125 represents a second back-drilled via having a shorter length via and a longer drilling length. The structure along column 130 does not include a via through the PCB 101 but may have a shallow, blind via 132 that connects a surface bond pad 111 to a first inner layer. The structure along column 135 represents a surface bond pad only.

The connection structures 125, 130, and 135 may be dubbed as agressors 140. Agressors 140, because of the shallow depth of the via barrel such as in back-drilled via 125 and blind via 132, or the total absence of a via barrel as in the surface pad 135, will allow the PCB 101 to thermally expand more in these locations and threaten the integrity of bond joints to a victim 115. A victim 115 site may be one such as the VIPPO 110. As illustrated further in FIG. 2, a metal joint 223 on top of a victim 110 that is adjacent to an aggressor 140 under heat stress may crack or fail, unless proper layout techniques are followed as described herein.

In the back-drilled structure such as via 120 or 125, a via is removed from the bottom of the PCB 101. No electrical stub on the bottom of the board remains. A partial via such as via 120 or 125 is created that extends through a section of the board. This is different than VIPPO 110 that extends through the whole PCB 101. The VIPPO 110 acts like a rivet and does not expand very much. By the very nature of a VIPPO, a solder ball 150 of a BGA could be placed right on top of an interconnect 151 as opposed to be adjacent to it as is the case with PTH 105. During reflow or other heat treatment, if a solder ball 150 were placed directly above PTH 105, the solder ball 150 would melt into the PTH hole. Instead, with a VIPPO 110, the solder ball 150 may remain above the interconnect, ensuring less distortion of signals traveling up and down the VIPPO.

If there is a solder ball 150 on top of a VIPPO 110, and if the solder ball 150 is on top of one of the back-drilled vias 120 or 125, and a reflow process is performed, the PCB 101 expands, but the interconnect 151 on and the interconnect 153 under the VIPPO constrains the PCB 101, such that there is very little board expansion that occurs in the area of the VIPPO 110. However, adjacent to it, the back-drilled vias 120 and 125 are free to expand, to float up with the PCB 101 as the PCB 101 expands, and to contract back. A constrainment differential is created and the differential directs forces through solder joints of mixed via locations. Mixed via locations refer to the intersection point between a victim 115 via and an aggressor 140 via. At a temperature near the reflow temperature, the differential is sufficient to pull a solder ball 150 off a bond pad 111 and break the joint between the two. In a mixed via location there is a pad of an aggressor via that is moving up and down right next to a pad in a victim via that is being constrained not to move. The differential in stresses occurring just before the point of reflow may damage or break the joints.

Figure 2:
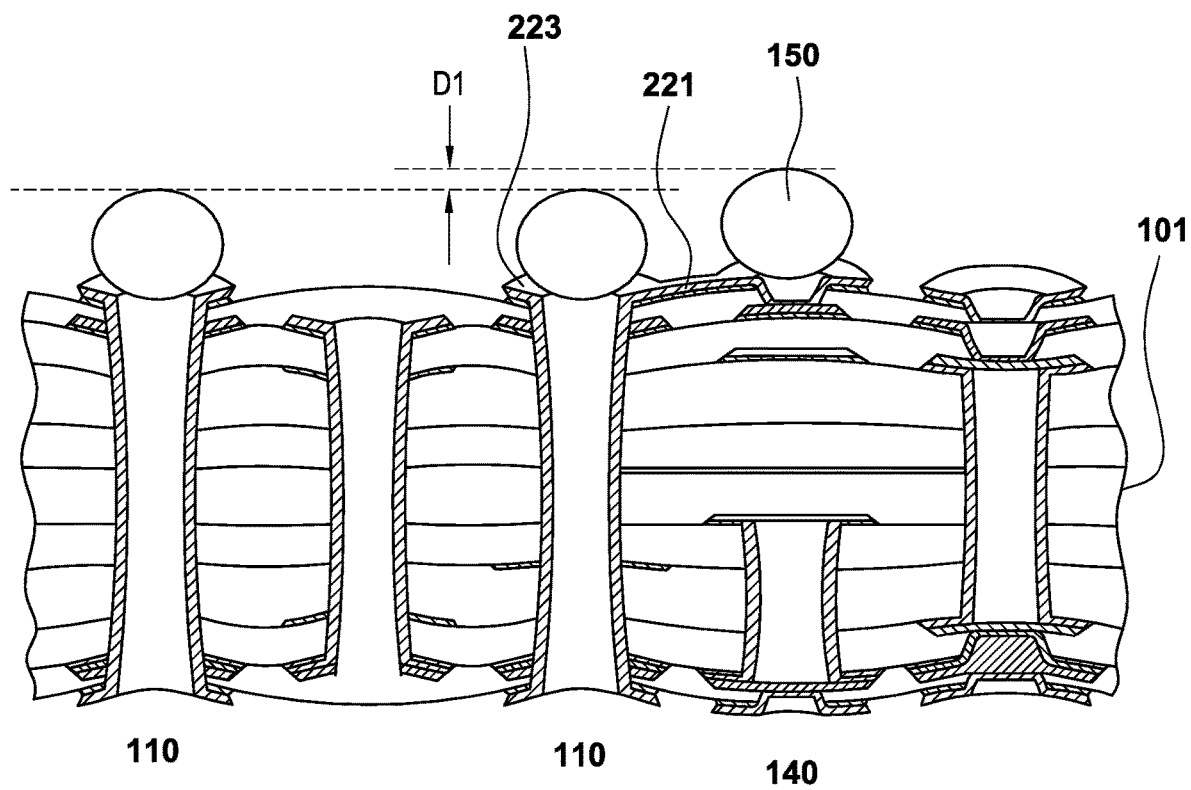
FIG. 2 illustrates a cross-sectional view of a thermal expansion of a PCB 101 in accordance with FIG. 1.

FIG. 2 illustrates a cross-sectional view of a thermal expansion of a PCB 101 in accordance with FIG. 1. At high temperatures the VIPPO 110 constrains the expansion of the PCB 110, while aggressors 140 such as microvias, back-drilled vias, and surface pads are free to move with the expansion. A difference in the expansion height of the board is illustrated at D1, wherein in the solder ball 150 atop the aggressor 140 moves to a height commensurate with the height of PCB 101 expansion. As a result, the solder ball joint sitting atop the Vippo via 110 will become stretched and weak.

Solder joint cracking and weakness tends to occur at locations such as interconnect 221 with differential stresses.

To avoid these problems, many manufacturers have decided not to mix VIPPOs, back-drilled vias, and/or surface mount connectors on a single board. Embodiments described herein that use mixed interconnects were researched and experimented with to include interconnects of various depths. These interconnects of various depths provide diversity and flexibility to a board design, as well as enhanced electrical characteristics to route various signals on different layers of a PCB 101 so as to improve signal quality.

Embodiments described herein thus remedy issues when mixed interconnects are formed or placed in proximity to each other. Referring to FIGS. 1 and 2, illustrated are a victim via 115 and a VIPPO 110. When the PCB 101 expands in different places, the VIPPO 110 itself does not get broken. The solder pad 223, for example, on top of the VIPPO 110 is the victim. Portions of the PCB 101 at the aggressors 140 may float, but the VIPPOs 110 do not float and expand relatively little in terms of thermal expansion, thus the joint 223 takes up the difference and breaks.

Figure 3A:
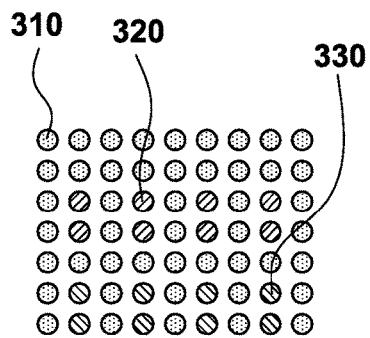
FIGS. 3A-3E illustrate a variety of mixed interconnect solder ball layouts in accordance with embodiments described herein.

FIGS. 3A-3E illustrate a variety of mixed interconnect solder ball layouts in accordance with embodiments described herein. FIG. 3A illustrates a configuration of vias that may cause joint failure, in which transitions in a PCB between VIPPOs and back-drilled vias are close. A transition is a space in a PCB between a VIPPO and a non-VIPPO along a row or column layout direction of the PCB. Spaces in a PCB that span one VIPPO to another VIPPO are not transitions. Likewise, spaces in a PCB between two non-VIPPOs are not transitions. Transitions in a PCB result in situations in which a victim joint such as a VIPPO solder joint may be weakened. Transitions cause weakness in a PCB at the victim joint when a victim via such as a VIPPO is positioned next to two or more aggressor vias, or next to two or more transitions. This may also be stated when there is one or more PCB transitions between a victim via and an aggressor via, a victim via solder joint may be damaged when a PCB is heated to reflow temperatures. A VIPPO joint may also be in weakened when a given VIPPO or victim via is positioned next to two or more transitions, when one transition is in an adjacent row and the other transition is in an adjacent column to the victim via. Victim vias and aggressor vias may be laid out in a row and column grid pattern. The grid pattern may correspond to balls on a BGA package.

The solid circles 310 represent capped VIPPOs. The right-slanted circles 320 represent back-drilled vias with a remaining via barrel length that is within only the first tercile of the board. The left-slanted circles 330 represent back-drilled vias with a remaining via barrel length that is greater than the first tercile. For structural integrity of solder balls and joints according to embodiments discussed herein, a VIPPO 310 may be positioned only next to a single non-VIPPO 320 or 330 in any row or column direction of an array pattern. VIPPO may not be positioned next to more than one non-VIPPO 320, 330, or other aggressor type structure in adjacent rows or columns.

A depth of back-drilling a VIPPO may be any amount to any layer. Multi-layer boards are enumerated such that the top layer is layer one, the bottom layer having a number representing the number of layers therein. In a twenty-four layer board, for example, a VIPPO may be back-drilled to layer twenty-two, near the bottom. The board may for example be back-drilled to layer eighteen, sixteen, thirteen, nine, four, or two. Layer two being close to the solder joints. Experiments performed to arrive at embodiments presented herein have determined that when a VIPPO is back-drilled to a layer within the first tercile of the board, (the first third of a board from layer one), this back-drilled via becomes an aggressor. When the length of the back-drilled via is greater than the first tercile, the back-drilled via is still able to constrain the PCB against thermal expansion and therefore is not considered an aggressor. Embodiments described herein note that the first tercile demarcation has some tolerances. If a PCB is constructed of a material that expands more, the remaining via portion may be longer and back-drilled portion may extend a shorter distance into the PCB. If the PCB is constructed of a material that expands less is firmer and does not expand easily, the remaining via portion may be shorter and the back-drilled portion may extend a further distance into the PCB.

In FIG. 3A, VIPPOs 310 are positioned directly adjacent less than first tercile vias 320 and directly adjacent greater than first tercile vias 330. The joints above the VIPPOs 310 that are adjacent to the backdrilled vias 320 will be at risk. While the joints between the VIPPOs 310 and the greater than second backdrilled vias 330 will be stronger than the former, depending on how far the second backdrilled vias 330 are back-drilled.

Figure 3B:
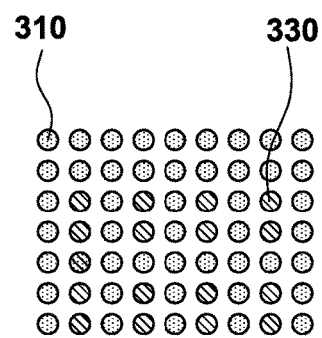

FIG. 3B illustrates a via layout to decrease localized stress in accordance with embodiments described herein. In FIG. 3B, in order to minimize stress on VIPPO joints, only the second backdrilled vias 330 are used in combination with the VIPPOs 310. While this combination may be effective, this layout does not make use of all types of via lengths for a diverse circuit design.

Figure 3C:
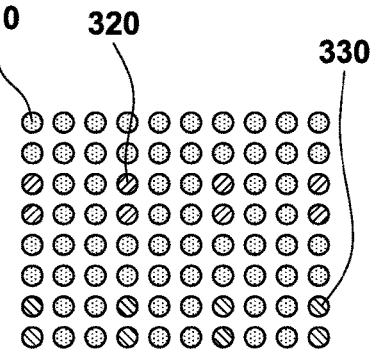

FIG. 3C illustrates another layout to decrease localized stress in accordance with embodiments described herein. As illustrated, and as determined by experiments conducted in accordance with described embodiments, VIPPOs 310 and associated joints may be best protected when there is at least a 2:1 ratio of space between transitions from a VIPPO 310 and aggressor vias. The first number in the ratio informing a number of rows or columns between two transitions in a column or line direction. A ratio of 3:1 and greater is also effective to achieve distance between the transitions from a VIPPO to a back-drilled via. As illustrated, the first back-drilled vias 320 and second backdrilled vias 330 are not closer than two rows or columns from one another. This distance manages the transitions between the different types of vias. When there is a 1:1 distance ratio as illustrated in FIGS. 3A and 3B, a VIPPO 310 and joints associated therewith may feel pressure from the expansion of the adjacent back-drilled via bond pad 111. PCB locations associated with first and second back-drilled vias 320 and 330 may float or expand. The PCB locations of the VIPPOs 310 do not float or expand, and this different in board expansion brings stress to the VIPPO joints.

In the arrangement illustrated in FIG. 3C, an additional row of VIPPOs 310, also referred to as victim vias herein, is inserted between VIPPOs 310 and first back-drilled vias 320 and between VIPPOs 310 and second backdrilled vias 330. Because a VIPPO 310 has on one side thereof other VIPPOs 310, and only on another side a first back-drilled via 320 or second back-drilled via 330, at best a VIPPO 310 and associated joint will only feel pressure on one side from the first back-drilled via 320 or the second back-filled via 330. This decreased pressure will allow the joints atop and adjacent the VIPPO 310 to not be put at risk, and the PCB with mixed interconnects will be more robust and able to stand the temperature extremes of reflow and other processes. The stress between vias will be spread out and lower the magnitude of the stress.

A desired layout may include transitions, and may also be designed regarding rows and columns in a grid pattern of a PCB. In FIG. 3C, a set of one or more adjacent aggressor vias may be deemed a group. Various victim and aggressor via structures may be discussed regarding the heights of the metal in the vias, whether back-drilled or not. Therefore, a PCB may be laid out having a plurality of groups of first via structures having first heights laid out in rows and columns, and a plurality of second via structures having second heights, laid out in rows and columns. As illustrated in FIG. 3C, there are not less than two rows or columns between any two groupings of agressor vias. In other words, a distance between two groups of first via structures may include at least two rows or columns. This distance of two rows or columns from agressor groups allows the victim vias adequate spacing to prevent joint failure as discussed here.

Figures 3D, 3E:
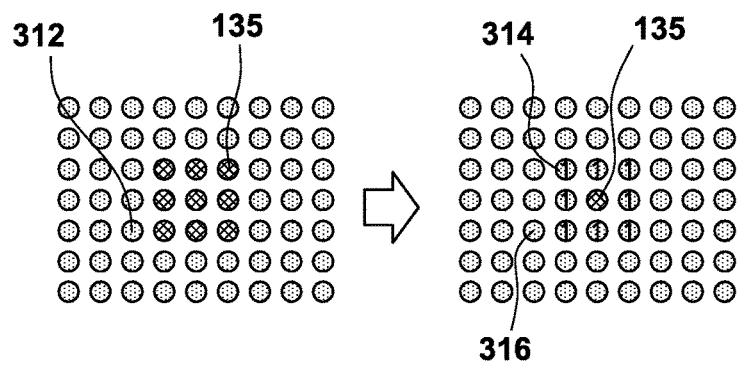

FIG. 3D illustrates an area of surface connections in accordance with embodiments described herein. In some circuit designs, unused interconnects may be surface connections or surface pads such as those illustrated as 135 in FIG. 1. These surface connections 135 represent aggressors when positioned adjacent VIPPOs 312. One way of alleviating stresses on the VIPPO 312 joints is to convert the surface connections 135 into VIPPOs.

FIG. 3E illustrates converted surface connections 135 to VIPPOs 314 in accordance with FIG. 3D. In FIG. 3E, an outer ring of surface connections 135 has been converted to an outer ring of VIPPOs 314 to surround the surface connection 135. By converting the surface connections 135 to VIPPOs 314, the VIPPOs 314 do not have to be connected and become sacrificial. This creates a buffer between VIPPOs that are electrically connected within the PCB 101 and VIPPOs that are not electrically connected. This bifurcation of VIPPOs brings down the stress level on outer VIPPOs joints such as 316. In FIG. 3E, a PCB can be modified based on a pinout of a BGA chip to be mounted thereon.

Layouts such as those illustrated in FIGS. 3A-3E can be done at the board level when a chip is configured. A VIPPO includes a metal via barrel that goes through the PCB 101. A VIPPO provides connection from an upper or lower layer to any and all internal layers that are desired.

A VIPPO is like a traditional plated through hole (PTH). A solder connection cannot be placed on top of a PTH because there is an open hole. If a board is reflowed, the solder gets sucked down into a PTH hole. The VIPPO via barrels are filled with a non-conductive epoxy, that is then cured and capped cap on the external ends, resulting in a metalized surface with no hole on the external ends. A solder joint can therefore be mounted thereon. A VIPPO may have better signal integrity than a PTH that has a solder ball off to the side. Because a solder joint and solder ball can be placed directly atop a VIPPO, an additional change in direction of a signal is eliminated, and signal can move straight into or out of a card (not illustrated) and into or out of the mounted solder ball 150.

As described above regarding FIG. 3E, in some implementations, aggressor interconnects may be converted to VIPPOs to make them less aggressive.

Backdrilled vias that go through most of the card and leave a little bit of via are more likely to float and create major stresses, but backdrilled vias that only take the bottom half of the via end up behaving more like a through via or a VIPPO. The stress differential is not as substantial with a via that extends longer than a first tercile of a via compared to the stress caused by a via back-drilled to be less than the first tercile. The end of the first tercile may be the first third of the via from the top surface of the PCB 101. Tolerances may be plus or minus five percent. Thus if a first tercile is thirty-three percent, tolerances may bring a range of via length to between 28 percent and 38 percent for the first tercile. Practically, if a board is twenty-four layers, for example, a line of demarcation for the first tercile may be at layer eight. Typically, vias that are back-drilled to layers seven and below will be aggressors. According to embodiments described herein, a given VIPPO should not have more than one transition between itself and an aggressor in any column or row direction. Experiments have demonstrated that vias that are back-drilled to layers eight and above provide better thermal stability, preventing the vias and solder joints associated therewith to not expand to the level of the bottom one third. Embodiments described herein are different ways to lessen the stress level on the victim joints of VIPPOs.

Back-drilling of VIPPOs provides benefits including diversity of function of circuits that can be used therewith. In applications using high speed signals, full VIPPOs may be disadvantageous. If, for example, a signal is routed from a chip (not illustrated) through a solder ball 150 to a VIPPO, to be routed into layer five of the PCB 101. Once the signal is routed to layer five, a part of the signal will keep going down to the bottom of the VIPPO at layer twenty-four in a twenty-four layer board. The signal will then bounce back up the VIPPO, out the solder ball into the card above, causing distortion. To avoid that, after the initial VIPPO has been patterned, a larger drill is used to drill out the VIPPO to layer six or seven. Thus the signal will enter and exit layer five. The barrel of the via ends just beyond layer five. A magnitude of reflection and resonance has been muted, and will have less impact on a signal. In some embodiments, all high speed signals are back-drilled.

A VIPPO may act like a rivet. With the metal plating of the via barrel, the VIPPO may constrain the whole board, in the immediate vicinity of the via barrel. Restricting the PCB from expanding in that location. When a via is back-drilled to a layer lower than the first tercile, the top of the via barrel can float when the PCB expands and contracts during heat treatments such as reflow operations.

The structural constrainment of the VIPPO may be attributed to the rivet-like connections established at a top side and bottom side of a PCB 101. When a PCB 101 is back-drilled, this structural integrity is weakened. The deeper a PCB 101 is back-drilled, the more the structural integrity is weakened. If the PCB 101 is only backdrilled a few layers, such as to layer twenty or twenty-one in a twenty-four layer board, the PCB will have a greater structural integrity than if the board is back-drilled to layer seven or below. The rivet effect of an upper solder joint works with a longer back-drilled portion to constrain the PCB. When a VIPPO has been back-drilled to a layer within the first tercile, even though the top joint may provide the rivet, the weaker via structure will rise and fall with the thermal expansion of the board, straining the solder joint.

Some solder balls 150 that sit atop backdrilled locations will swell during reflow as the PCB expands. They will be able to go up and back down. But the VIPPOs are fixed in place and see far less expansion. Without the layout designs described herein, the differential in thermal stress protection of different via structures drives solder joint failures.

When designing a board, considerations may be undertaken to provide adequate space between layers that will have shallower vias versus longer vias.

There are several ways to implement the layout strategies described herein. One way may be considered a mitigation method, when a BGA array pinout has already been established for a given chip, and a PCB in which the BGA chip is to be mounted can be configured to maximize the design rules discussed herein. A second way to implement the layout strategies would be to do so at the time of chip design, considering which signals may be transmitted via shallow PCB layers, and determining a correct layout of the BGA chip and corresponding PCB to minimize risk of joint failure.

In a first example, when a BGA chip is provided with a pinout defined and not variable, the BGA chip is examined to determine where the signal inputs and outputs are. Routing through a PCB is dependent on this pinout. The PCB may be altered to route signals there through, and every effort may be made not to provide more than one aggressor via next to a VIPPO in a given row or column. Transitions between a victim via and an aggressor via may be two or more rows apart or two or more columns apart. In a pre-defined BGA scenario, best efforts are made to keep the transitions between victim vias and aggressor vias outside of a desired range, such that a VIPPO does not have more than one transition to an aggressor via in a row or column direction. Aggressor vias may be grouped together, adjacent to one another. Victim vias may also be grouped together, adjacent to one another.

Figure 4A:
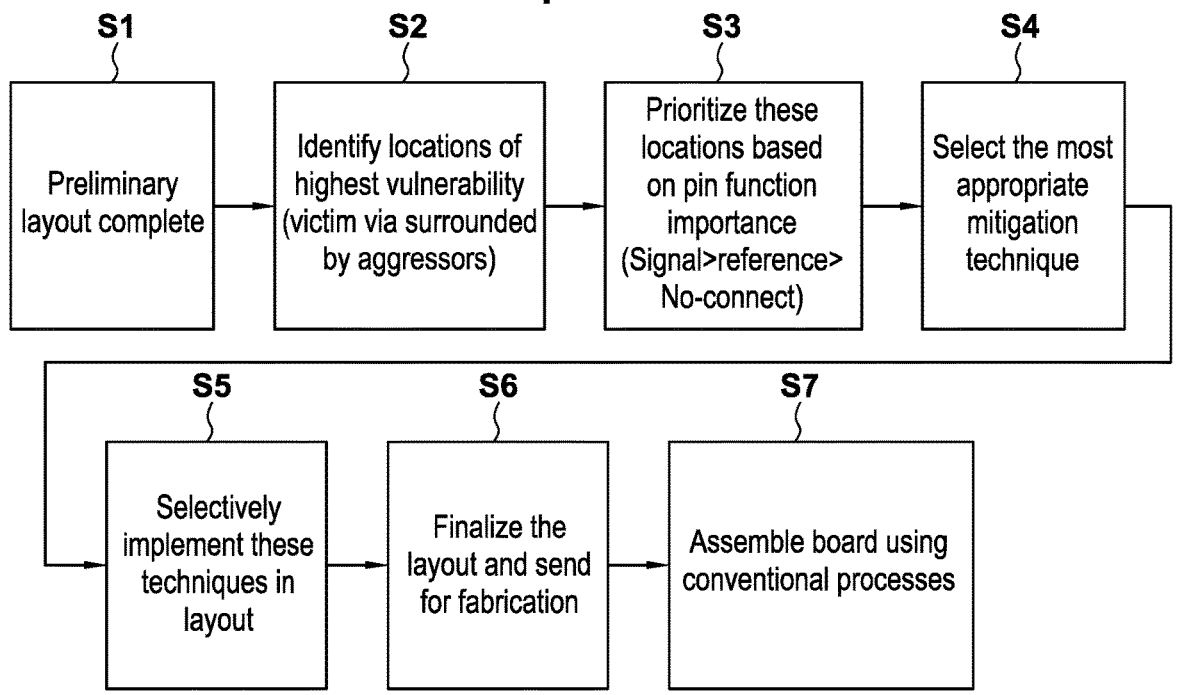
FIG. 4A illustrates a process flow to configure a PCB with a fixed component pinout of a BGA in accordance with embodiments described herein.

FIG. 4A illustrates a process flow to configure a PCB with a fixed component pinout of a BGA in accordance with embodiments described herein. As illustrated in FIG. 4A, a first step S1 may be that a BGA has arrived with a preliminary layout complete. At step S2, a program may identify locations in a PCB corresponding to the BGA layout having the highest vulnerability, such as where a victim via is surrounded by aggressors. At step S3, locations of vias may be prioritized based on pin function importance. For example, pins may be identified regarding which are signal pins, which are power or ground pins, and which pins have no connection. At step S4, depending on the BGA pin layout, determinations may be made regarding a proper mitigation technique to minimize solder joint failure. The PCB may be analyzed to determine which VIPPOs can be backdrilled, and to what board level. Analysis may be performed to group aggressor vias together, or victim vias together, or spread the transitions between aggressor vias and victim vias farther than two columns and two rows apart. If, as illustrated and described relative to FIGS. 3E and 3F, it is determined that no-connect surface connections are present that may threaten a VIPPO, then the no-connect surface connections may be designated and created to be sacrificial VIPPOs, leaving a smaller number of no-connect surface connections present.

At a step S5, after the design considerations are made, the design techniques may be selectively laid out for the PCB and implemented. At step S6, the layout is finalized and may be sent for PCB fabrication. At step S7, the PCB is assembled.

In a second scenario, such as an application specific integrated circuit (ASIC) or field programmable gate array (FPGA), when a device is being configured, control over the pinout is possible such that the PCB may be designed to minimize aggressor via and victim via interaction. Thus transitions between an aggressor via and a victim via will be at least two rows or two columns apart.

Figure 4B:
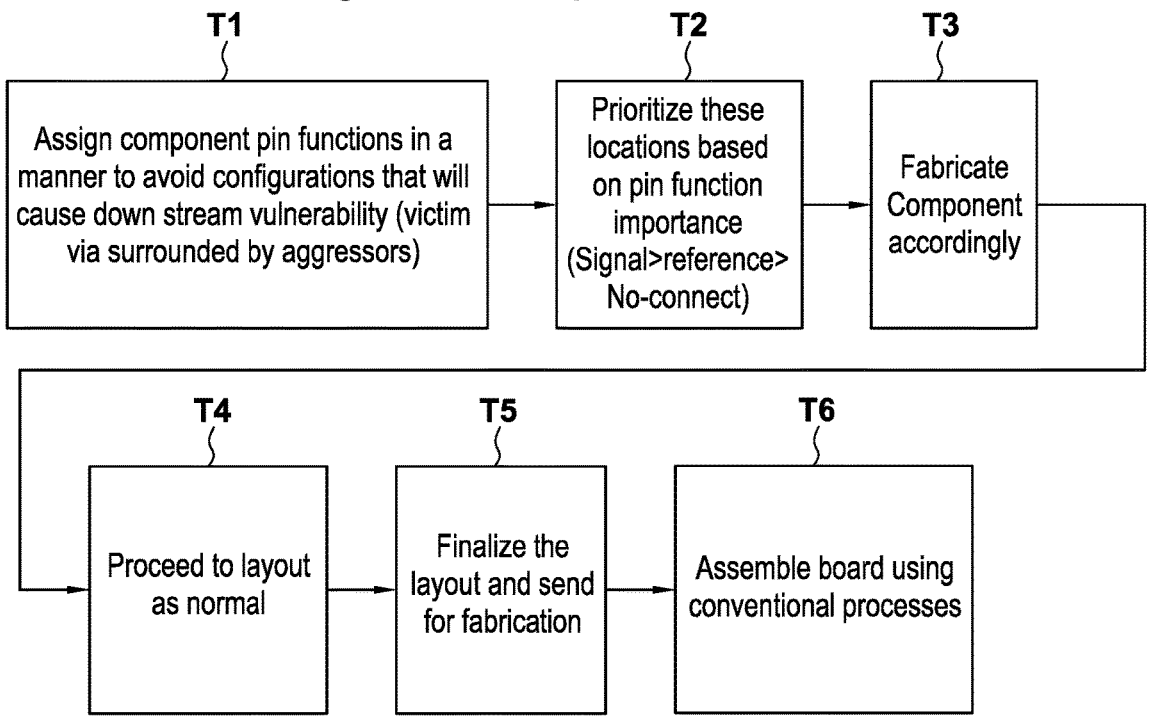
FIG. 4B illustrates a process flow to configure a PCB with a configurable component pinout of a BGA in accordance with embodiments described herein.

FIG. 4B illustrates a process flow to configure a PCB with a configurable component pinout of a BGA in accordance with embodiments described herein. In a first step T1, component pin functions may be assigned in a manner to avoid configurations that will cause down stream vulnerability, such as victim vias surrounded by two or more aggressors. In a step T2, locations of vias may be prioritized based on pin function importance. For example, pins may be identified regarding which are signal pins, which are potential or ground pins, and which pins have no connection. In a step T3, a chip component may be fabricated having the pinout so designed. In step T4, a layout of a PCB will coincide with the layout of the chip where minimal harmful transitions have been laid out. In step T5, the layout of the PCB may be finalized and sent for fabrication. At step T6, the PCB is assembled.

The difference in thermal expansion between a VIPPO via and a back-drilled via relates to an amount of metal versus board material throughout the lengths of the via. Metal in a via expands less than the PCB material. A copper via will expand at a near linear rate of about seventeen parts per million (ppm) per degree of temperature change from room temperature up to reflow temperature, which is about a 0.3 to 0.4 percent size increase.

A board may initially expand at a similar rate, but when the PCB hits the glass transition temperature, about half way between room temperature and reflow, the PCB material begins to expand greatly. The overall amount of expansion of the board material may be in the 3 to 4 percent range over the entire reflow temperature, which may be about ten times higher in ppm than the metal interconnect. Expansion of board materials range from 2.8 percent 5 percent.

Based on the theory described above and confirmed by extensive testing, embodiments described herein use one of the configurations instructing proprietary design rule changes including the avoidance of using VIPPOs in isolation (surrounded immediately by high expansions interconnect). According to embodiments described herein, using a pair of VIPPOs (such as in a configuration of 2:1) that the chances of VIPPO joint failure decrease. One of the design rules according to embodiments described herein is to use VIPPOs in columns of two when interspersed with high expansion interconnect structures (as opposed to columns of one. Of the five configurations studied, use of VIPPOs in pairs or in triplets (2:1, 3:1) are illustrated and described herein.

According to other embodiments described herein, it was found that limiting the depth of backdrills to the first two terciles of a card thickness greatly diminishes the chances of VIPPO joint failures. Design rules associated with this finding would have it that backdrilled vias when used immediately adjacent to isolated VIPPOs should be limited to the first two terciles of the card (or ~layer 10 in a 30 layer board). Conversely, surface routing, uVias and Backdrills into the third tercile are to be avoided when next to VIPPOs.

Embodiments described herein including associated design rules can be used separately or when possible in combination to decrease the risk of VIPPO joint failures. These design rules while limiting (when applied to an existing design) do provide a path forward for mixing interconnect while minimizing the risk of VIPPO joint failure. In anticipation of this, device pinout (ASIC, FPGA) can be configured in a way to anticipate these design rules and hence lessen the impact on the design. CAD tools could be updated to implement these design rule automatically during routing.

Applying these design rules and interconnect configurations allows the continued use of mixed interconnect whilst minimizing the risk of solderjoint "hot tearing" during secondary soldering operations (double sided assembly, rework, adjacent part rework, etc).

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A printed circuit board (PCB) having a layout aligned with a Ball Grid Array (BGA) package, the layout comprising:
a plurality of victim vias arranged in the PCB, wherein each victim via of the plurality of victim vias is a Via In-Pad Plated Over (VIPPO); and
at least one aggressor via arranged in the PCB having a transition with at least one victim via, wherein the at least one aggressor via extends lower than a first tercile of a PCB, the transition is a space in the PCB between a victim via and an aggressor via along a row or column direction, and the victim via is not positioned next to more than one transition.

2. The PCB of claim 1, wherein the victim via is not positioned next to more than one aggressor via along a row direction or a column direction.

3. The PCB of claim 1, wherein an arrangement of transitions is designed to correspond to a BGA having a fixed pinout.

4. The PCB of claim 1, wherein the aggressor via is a back-drilled via having a length smaller than a first tercile of a PCB.

5. The PCB of claim 1, wherein there is not more than one aggressor via spaced one transition from a victim via in a row direction or a column direction.

6. The PCB of claim 1, wherein at least two consecutive rows of VIPPOs intersect the at least two consecutive columns of VIPPOs.

7. A Printed Circuit Board (PCB) having a layout structure with rows and columns of vias, the PCB comprising:
a plurality of groups of first via structures having first heights laid out in rows and columns, wherein each via structure of the plurality of groups of first via structures is a Via In-Pad Plated Over (VIPPO); and
a plurality of second via structures having second heights, laid out in rows and columns, wherein an upper portion of each second via structure of the plurality of second via structures has a conductive pad thereon, and a distance between two groups of first via structures of the plurality of groups of first via structures includes at least two rows or two columns.

8. The PCB of claim 7, wherein a height of each first via structure of the plurality of groups of first via structures is less than one-third of a height of the PCB.

9. The PCB of claim 7, wherein the first via structures of the plurality of groups of first via structures have a first thermal expansion characteristic and the second via structures of the plurality of second via structures have a second thermal expansion characteristic which is different from the first thermal expansion characteristic.

10. The PCB of claim 7, wherein the layout of first via structures of the plurality of groups of first via structures and second via structures of the plurality of second via structures corresponds to signal layers of the PCB.

11. The PCB of claim 7, wherein the distance between the two groups of first via structures of the plurality of groups of first via structures includes at least two transitions, wherein a transition is a space between a first via structure and a second via structure of the plurality of second via structures.

12. A method of fabricating a printed circuit board (PCB) to be aligned with a Ball Grid Array (BGA) package, the method comprising:
   laying out a plurality of victim vias arranged in the PCB, wherein each victim via of the plurality of victim vias is a Via In-Pad Plated Over (VIPPO); and
   laying out at least one aggressor via arranged in the PCB having a transition with at least one victim via of the plurality of victim vias, wherein the transition is a space in the PCB between a victim via and the at least one aggressor via along a row direction or a column direction, and the victim via is not positioned next to more than one transition, wherein a BGA is mounted on the PCB and the BGA has a configurable pinout before designing the PCB.

13. The method of claim 12, wherein laying out the plurality of victim vias and the at least one aggressor via includes a layout of first via structures and second via structures which corresponds to signal layers of the PCB.

* * * * *